United States Patent [19]

Gonzalez et al.

[11] Patent Number: 5,057,551
[45] Date of Patent: Oct. 15, 1991

[54] ADHESIVES THAT CONTINUE TO HARDEN IN DARKNESS AFTER PHOTOINITIATION

[75] Inventors: Rene-Andres A. Gonzalez, Duesseldorf; Heinz-Christian Nicolaisen; Lothar Kammer, both of Hanover, all of Fed. Rep. of Germany

[73] Assignee: Henkel Kommanditgesellschaft auf Aktien, Duesseldorf, Fed. Rep. of Germany

[21] Appl. No.: 318,091

[22] Filed: Mar. 2, 1989

[30] Foreign Application Priority Data

Mar. 2, 1988 [DE] Fed. Rep. of Germany ....... 3806745

[51] Int. Cl.$^5$ .......................... C08F 2/46; C08G 8/28
[52] U.S. Cl. ...................... 522/170; 522/25; 522/31; 525/482; 528/103; 528/110
[58] Field of Search .................. 522/170, 25; 525/482; 528/103, 110

[56] References Cited

U.S. PATENT DOCUMENTS

| 4,173,476 | 11/1979 | Smith et al. | 430/280 |
| 4,186,108 | 1/1980 | Carlson et al. | 252/426 |
| 4,657,779 | 4/1987 | Gaske | 522/170 |
| 4,776,992 | 10/1988 | Irving | 522/25 |

FOREIGN PATENT DOCUMENTS

| 0118044 | 9/1984 | European Pat. Off. . |
| 0119425 | 9/1984 | European Pat. Off. . |
| 1593192 | 1/1979 | United Kingdom . |

OTHER PUBLICATIONS

Ullman's Encyclopedia of Industrial Chemistry, Weinheim, 1985, vol. A1, pp. 230–241.
Makromol Chem. Rapid Comm., Mar. 1987, H. J. Timpe, pp. 353–359.
Advances in Polymer Sciences 62 (Initiators–Poly–Reactions–Optical Activity,) 1984, cf. J. Crivello, pp. 1–48.
J. Radiation Curing, W. C. Perkins, Jan. 1981, p. 16.
J. Radiation Curing, S. Peter Pappas, Aug. 1981, p. 28.

Primary Examiner—Marion E. McCamish
Assistant Examiner—Mark A. Chapman
Attorney, Agent, or Firm—Ernest G. Szoke; Wayne C. Jaeschke; Norvell E. Wisdom, Jr.

[57] ABSTRACT

Adhesives containing some bifunctional and some at least trifunctional epoxide compounds, photoinitiators, and acrylates of methacrylates corresponding to general formula $$CH_2=C(R^1)\text{-}CO\text{-}(OC_mH_{2m})_n\text{-}OR^2$$

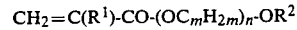

in which $R^1$ is hydrogen or methyl and $R^2$ is a hydrocarbon radical containing a cationically cleavable oxacycloalkyl or oxacycloalkenyl group, continue to harden in darkness after their hardening has been photoinitiated, and thus can produce strong bonds between opaque substrates, when the substrates are coated with the adhesives, the adhesive coatings are exposed to light to initiate the hardening, and the coated substrates are pressed together within a short interval before the hardening of the photoinitiated adhesives advances to the gel point.

20 Claims, No Drawings

ADHESIVES THAT CONTINUE TO HARDEN IN DARKNESS AFTER PHOTOINITIATION

FIELD OF THE INVENTION

This invention relates to adhesives which continue to harden in darkness after photoinitiation and thus are suitable for the bonding of non-transparent substrates such as metals.

STATEMENT OF RELATED ART

Photoinitiated cationic polymerization of epoxides has long been known, cf. J. Crivello, "Advances in Polymer Science" 62, 3 (1984). Organic sulfonium and iodonium salts are mentioned in this article as suitable photoinitiators, i.e. compounds which, after irradiation with light, release protons and, in doing so, initiate the polymerization of epoxides.

Iodonium salts as constituents of photopolymerizable compositions containing acid-polymerizable or acid-curable materials are also described in DE-OS 26 02 574. The adhesive compositions described in this publication may also be used as adhesives for substrates which can be irradiated "in situ", for example in the formation of laminates in which one ply or layer or both are permeable to radiation. However, full bonding is only possible with substrates in which at least one substrate is permeable to the radiation required for the polymerization reaction. This is a major disadvantage of the otherwise entirely satisfactory adhesives described in the above-cited publication.

Sulfonium salts containing aromatic substituents, which are suitable as photoinitiators for the polymerization of epoxidic monomers, are described in DE-OS 29 04 450 and in U.S. Pat. No. 4,173,476. However, the systems described therein have such low viscosities that they can hardly be used as adhesives. In addition, the crosslinking reaction, once initiated, progresses at such a high rate that the final hardening is a safety hazard at many places where use of the adhesives might be desired.

Onium salts may be used as photoinitiators for the radical polymerization of vinyl polymers, cf. H.-J. Timpe, 8 *Makromol. Chem. Raoid Commun.* 353 (1987); W. C. Perkins, *J. Radiation Curing* (January 1981), page 16; and S. Peter Pappas, Radiation Curing (August 1981), page 28. However, the adhesive systems described therein require continuous irradiation for full polymerization, so that they can only be used as coating compositions.

Photoinitiator-polymerizable systems containing epoxide compounds are also described in EP-A 0 119 425 and in EP-A 0 118 044. However, the strengths of the bonds obtained with these systems are poor (shear strengths below 1 N/mm²). This is attributable to the fact that the hardened adhesive films have a poor affinity for metal surfaces.

DESCRIPTION OF THE INVENTION

Except in the operating examples or where otherwise explicitly stated, all numerical quantities in this description that specify amounts of materials or reaction conditions are to be understood as modified by the word "about".

The present invention provides adhesives which continue to harden in darkness after photoinitiation and which produce bonds of excellent strength on nontransparent substrates. This object is achieved by adhesives containing the following components:

a) one or more bifunctional glycidyl ethers of an optionally modified diphenylol propane having epoxide equivalents of from 150 to 300;

b) epoxide compounds, with at least three epoxide groups per molecule, selected from the group consisting of the glycidyl ethers of glycerol, trimethylol propane, pentaerythritol, and novolaks;

c) one or more photoinitiators releasing protons under the influence of electromagnetic radiation; and d) acrylates or methacrylates corresponding to general formula I

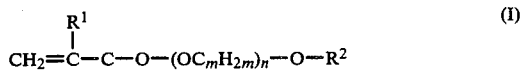

in which $R^1$ is hydrogen or methyl; $R^2$ is a radical with up to 15 carbon atoms that is a hydrocarbon radical except for containing a cationically cleavable $C_2$-$C_5$ oxacycloalkyl or a $C_5$ oxacycloalkenyl group; m is either 2 or 3; and n is 0, 1, or 2, and, optionally, e) photosensitizers, pigments, and/or other conventional auxiliaries for photoinitiated adhesive compositions.

Component (a) of the compositions according to the invention as set forth above is selected from the general class of materials known in the art as "epoxy resins". Hereafter in this specification and in the claims, the term "epoxy resin" is to be understood as including "simple" epoxy resins, elastomer-modified epoxy resins, and/or any one of the other types of epoxy resins modified by the presence of other types of resins, as described in Chapter 15 of the well known reference work, Henry Lee and Kris Neville, *Handbook of Epoxy Resins* (McGraw-Hill, N.Y., 1967).

The bifunctional glycidyl ethers of an optionally modified diphenylol propane having epoxide equivalents of 150 to 300 which are present in the adhesives according to the invention are commercially available as liquid components and, in addition, are described, for example, in *Ullmanns Encyclopedia of Industrial Chemistry* (VCH-Verlagsgesellschaft, Weinheim, 1985), Vol. A1, pages 230–241. Suitable commercial examples are described below in connection with the operating examples.

Epoxide equivalent weight is to be understood in this application as the quantity of epoxy resin (in grams) which contains one equivalent of epoxide groups (i.e., Avogadro's number of epoxide oxygen atoms). An epoxide equivalent weight of 170 means, for example, that 170 g of a resin containing epoxide groups contains one equivalent of such epoxide groups.

The trifunctional epoxide compounds from the group consisting of the glycidyl ethers of glycerol, trimethylol propane, pentaerythritol, and novolaks, which are present in the adhesives according to the invention, are also commercially available compounds and enable a threedimensional network to be rapidly built up during the photopolymerization.

The photoinitiators releasing protons under the effect of electromagnetic radiation, which are present in the adhesives according to the invention, are known as such and, in some cases, are commercially available. By "electromagnetic radiation" is meant the entire wavelength range in which the electromagnetic radiation useable in practice to initiate photopolymerization is normally situated. This range is normally from 200 to 700 nanometers (nm). Photoinitiators activatable in the wavelength range from 200 to 600 nm are preferred.

Compounds from the group consisting of triaryl sulfonium salts corresponding to general formula (IV)

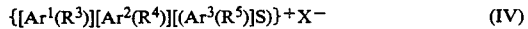
{[Ar¹(R³)][Ar²(R⁴)][(Ar³(R⁵)]S)}⁺X⁻ (IV)

and diaryl iodonium salts corresponding to general formula (V)

{[Ar¹(R³)][Ar²(R⁴)]I}⁺X⁻ (V)

are particularly preferred as photoinitiator components of the adhesives according to the invention.

In general formulas (IV) and (V), each "Ar" with a superscript independently represents an arylene group, such as a phenylene group. X. represents a halogen-containing complex anion, with preferred complex anions being selected from the group consisting of perchlorate, tetrafluoroborate(III), hexachloroantimonate(V), hexafluoroantimonate(V), hexachlorostannate(IV), hexafluorophosphate, hexafluoroarsenate(V), tetrachloroferrate(III), and pentachlorobismuthate(III). Each of the substituents $R^3$, $R^4$, and $R^5$, independently of one another, represents hydrogen, a nitro group, a halogen atom, an alkoxyl or thioalkyl group containing 1 to 6 C atoms in a straightchain or branched radical, a phenoxy or modified phenoxy group containing 1 to 3 substituents in the phenyl radical, or alkanoyl or alkanoylamido radicals containing 1 to 6 C atoms. In addition, in Formula (IV), two of the three substituents $R^3$, $R^4$, and $R^5$ may jointly represent a methylene group, i-propylene group, or carbonyl group, that forms a bridge between two adjacent aryl radicals to result in a heterocyclic thioxanthenium ion.

As already mentioned, the above-defined substituents $R^3$, $R^4$, and $R^5$ in general formulas (IV) and (V) may be, for example, alkoxyl, or thioalkyl groups containing 1 to 6 C atoms in the straight-chain or branched alkyl radical. Accordingly, suitable alkyl radicals of the alkoxyl or thioalkyl groups are methyl, ethyl, n-propyl, n-butyl, n-pentyl, or n-hexyl and the branched isomers of the straight-chain alkyl radicals mentioned. In preferred embodiments of the invention, the alkanoyloxy or alkanoylamido radicals containing 1 to 5 C atoms in the alkyl radical of the associated carboxylic acid may be derived from acetic acid, propionic acid, butyric acid, valeric acid or caprylic acid. Accordingly, $R^3$, $R^4$, or $R^5$ independently of one another may represent acetoyloxy, propionyloxy, butyryloxy, valeroyloxy, or capryloxy radicals, or the corresponding amido radicals of the carboxylic acids mentioned. $R^3$, $R^4$, and $R^5$ independently of one another may also represent substituted or simple phenoxy groups; in the case of substitution, one phenoxy group may contain 1 to 3 substituents. Suitable substituents are, primarily, nitro, halogen, or alkyl substituents containing 1 to 6 C atoms which are preferably selected from the group consisting of methyl, ethyl, n-propyl, n-butyl, n-pentyl, n-hexyl, and branched-chain isomers thereof.

Particularly preferred photoinitiators are selected from the following group of compounds: triphenyl sulfonium tetrafluoroborate, triphenyl sulfonium hexafluorophosphate, triphenyl sulfonium hexafluoro-antimonate, tritolyl sulfonium hexafluorophosphate, anisyl diphenyl sulfonium hexafluoroantimonate, 4-butoxyphenyl diphenyl sulfonium tetrafluoroborate, 4-chlorophenyl diphenyl sulfonium tetrafluoroborate, 4-chlorophenyl diphenyl sulfonium hexafluoroantimonate, tris-(4-phenoxyphenyl)-sulfonium hexafluorophosphate, 4-acetoxyphenyl diphenyl sulfonium tetrafluoroborate, tris-(4-thiomethoxyphenyl)-sulfonium hexafluoroborate, 4-acetaminophenyl diphenyl sulfonium tetrafluoroborate, 10-phenyl thioxanthenium hexafluorophosphate, 10-phenyl-9,9-dimethyl thioxanthenium hexafluorophosphate, and 10-phenyl-9-oxothioxanthenium tetrafluoroborate.

The acrylates or methacrylates of general formula (I) present in the adhesives according to the invention are known as such and are largely commercial compounds which are derived formally from acrylic acid or methacrylic acid and which are linked in an ester bond—optionally through an ethylenoxy and/or propylenoxy function—to an alcohol $R^2OH$. The group $R^2$ is or contains an oxacycloalkyl or oxacycloalkenyl function which, in the presence of protons, reacts with the polyfunctional epoxide compounds of the adhesive system according to the invention in a ringopening reaction.

Particularly preferred acrylates or methacrylates are those in which, in general formula (I), n=0 and the substituent $R^2$ has the general formula (II)

—CH₂—R⁶ (II)

in which $R^6$ is a $C_2$–$C_5$ oxacycloalkyl ring or a $C_5$ oxacycloalkenyl ring. The group $R^6$ is, most preferably, an oxirane, tetrahydrofuran, dihydropyran, or tetrahydropyran ring.

In another advantageous embodiment of the invention, the substituent $R^2$ of the acrylates or methacrylates corresponding to general formula (I) have the general formula (III)

—C₆H₄(R⁷)—O—glycidyl (III)

in which the group $R^7$ is hydrogen or vinyl. Compounds such as these corresponding to formula (I) are, formally, esters of acrylic or methacrylic acid with optionally vinylsubstituted difunctional phenols, an OH function of the difunctional phenols being reacted with epichlorohydrin. In this case, too, there may be an ethylenoxy and/or propylenoxy function between the acrylic or methacrylic acid function and the alkoxy function $R^2O$-, when m=2 and/or 3 and n=1 or 2 in general formula (I), although preferably n =0.

In another advantageous embodiment of the invention, the substituent $R^2$ corresponding to formula (I) may be a $C_5$–$C_{10}$ bicycloalkyl radical containing an epoxide function. One typical example of this is a substituent Rz which is formally derived from a diepoxide of dicyclopentadiene, an epoxide function of the diepoxide being reacted with ethylene oxide in a ring-opening reaction. The resulting hydroxyethyloxy-substituted epoxide of dicyclopentadiene is esterified with acrylic acid or methacrylic acid. Accordingly, acrylates or methacrylates of formula (I), in which $R^1$ is a methyl group, $R^2$ is an epoxidotetrahydrodicyclopentadienyl group and m=1 and n=1 or m=1 and n=0, are particularly preferred. Such compounds are commercially available.

In another advantageous embodiment of the invention, $R^1$ in general formula (I) is a methyl group, $R^2$ is a glycidyl-, tetrahydrofuranylmethyl-, dihydropyranylmethyl-, tetrahydropyranylmethyl-, or glycidoxyl- substituted styryl group. Such compounds are also commercially available.

The adhesives according to the invention may optionally contain photosensitizers, pigments, and/or other conventional auxiliaries familiar to the expert on adhesives, especially fillers and the like.

The photosensitizers optionally used are of the type typically used for the visible region of the electromagnetic spectrum, especially acridines, perylenes, and benzoflavins. Typical examples are acridine orange, acridine yellow, benzoflavin, setoflavin T, phosphine R, and perylene.

In another advantageous embodiment of the invention, the adhesives contain bifunctional glycidyl ethers of an optionally modified diphenylol propane having epoxide equivalents of 150 to 300 and containing at least trifunctional epoxide compounds in molar ratios so that one epoxide group of the at least trifunctional epoxide compounds is present for every 4 to 20 epoxide groups of the diphenylol propane glycidyl ether. Particularly preferred adhesives according to the invention contain from 0.7 to 1 part by weight of the acrylates or methacrylates of formula (I) for every 2 to 8 parts by weight of the bifunctional diphenylol propane glycidyl ether.

Finally, up to 20% by weight of the acrylates or methacrylates of formula (I) may be replaced by esters of acrylic or methacrylic acid with $C_1$-$C_6$ monoalkanols or $C_2$-$C_5$ polyalkanols containing 2 to 4 hydroxyl groups. Typical examples of these esters of acrylic or methacrylic acid are triethyleneglycol dimethacrylate, trimethylolpropane trimethacrylate, hexyl methacrylate, methyl acrylate, methyl methacrylate, ethyl acrylate, ethyl methacrylate, butyl acrylate, butyl methacrylate, hexyl acrylate, and the like.

To use the adhesives according to the invention, the adhesive mixtures are applied to at least one of the substrate surfaces to be bonded, preferably to both these surfaces. This is normally done by applying the viscous adhesive mass to the substrate surfaces, prepared to promote adhesion in the usual way, either manually by means of a spatula or by means of an automatic application system. The adhesive mixture is normally applied to the substrate surfaces in a layer thickness of from 0.5 to 3 mm.

The adhesive-coated substrate surfaces are then irradiated. This irradiation may be ultraviolet irradiation. However, the polymerization may also be initiated by irradiation which contains both visible and ultraviolet components. The radiation source may be sunlight or a special radiation source which only comprises light within a very narrow range of the electromagnetic spectrum.

An important step in the use of the adhesives according to the invention lies in the fact that the polymerization of the adhesive mixture is continued in the course of irradiation to just before the gel point of the polymer without the substrate surfaces coated with the adhesive mixture being fitted together. Accordingly, it is important to the success of the bonding process to determine the time in which the gel point is reached at the surface of the applied adhesive. Determination of the gel point is normally carried out under the same conditions under which the bonding process takes place. The gel point is best determined in a separate step, preceding the actual bonding process, for an adhesive mixture having a certain composition. The determination is made by applying a layer of adhesive to the substrate surfaces to be bonded and measuring the time from the moment of application for which the adhesive layer still draws "strings" of the polymer on contact with a wooden spatula, i.e. the time for which the polymer can still flow. The gel point of the polymer is reached when the surface of the adhesive layer no longer draws strings on contact with the spatula, i.e. no longer flows.

The time which has elapsed since the beginning of irradiation of the adhesive mixture coated on the substrates is thus the time in which the gel point of the particular polymer is reached. The adhesive-coated substrate surfaces to be bonded have to be fitted together within a short time interval just before the gel point is reached, i.e., before the time previously determined. If the substrate surfaces to be bonded are joined too early, the polymerization can come to a standstill in the joint. If the substrate surfaces coated with adhesive mixture are joined only after the gel point has been reached, they generally can no longer be bonded because the polymerization has already come to a stop. If, by contrast, the substrate surfaces coated with adhesive mixture are joined shortly before the gel point is reached, optimal bonding results can be obtained by the process according to the invention for the bonding of solid substrates. The tensile shear strengths obtained, particularly for metal substrates, are up to 25 $N.mm^{-2}$. Accordingly, they are markedly higher than the values hitherto obtained with conventional processes for bonding solid substrates. The particular advantage of the adhesives according to the invention lies in the fact that, providing the substrate surfaces coated with the adhesive mixture are joined shortly before the gel point is reached, the bonding polymer mixture hardens without any need for further irradiation. Accordingly, the polymerization may even be completed, for example, in the darkness of an adhesive joint.

Another advantage of the adhesives according to the invention is that they are so-called "one-component systems". This affords practical advantages inasmuch as the user no longer has to mix different components of the adhesive mixture together shortly before the bonding process. The adhesives according to the invention are stable in storage and do not require the addition of any thickeners, which frequently impair the adhesive properties.

The invention is illustrated by the following operating Examples.

EXAMPLE AND COMPARISON EXAMPLE 1

An adhesive mixture was prepared from the following components:

a) 160 g of a commercially available epoxy resin, a modified glycidyl ether of diphenylol propane, having an epoxide equivalent of 190 (suitable commercial examples for this component include Araldite TM 507 from Ciba Products Company, DER TM 336 from Dow Chemical Company, Epon TM 828 from Shell Chemical Company, and Lekutherm TM from Bayer AG);

b) 40 g of a commercial epoxy resin, an oligomer of bisphenol A diglycidyl ether, having an epoxide equivalent of 255 (suitable commercial examples for this component include Araldite TM 6030 from Ciba Products Company, DER TM 337 from Dow Chemical Company, Epon TM 830 or 834 from Shell Chemical Company, and Epotuf TM 37-141 from Reichhold Chemical Company);

c) 12 g of pentaerythritol tetraglycidyl ether, d) 8 g of a commercial triaryl sulfonium hexafluoroantimonate; and
e) 30 g tetrahydrofurfuryl methacrylate.

The mixture was prepared in daylight from which UV light had been excluded, by mixing the individual components in a mixer. The resulting adhesive mixture was applied in a layer thickness of 2 mm to an iron plate and irradiated with a commercially available UVA lamp (Heraeus, with UV output of 92 mW/cm$^2$) from a distance of 20 cm. The time for which the adhesive layer still drew strings on contact with a wooden spatula, i.e. the time for which it still flowed, was then measured from the first moment of irradiation. This time (=gel point) was reached after 7 seconds.

After determination of the gel point, another part of the adhesive mixture was applied to degreased and sandblasted iron plates measuring 10 cm×2.5 cm×0 5 cm. The adhesive was applied over an area of 2.5 cm$^2$. The iron plates coated with the adhesive mixture were irradiated for 6 seconds, i.e. until shortly before the gel point was reached. Two iron plates were then placed, one on top of the other, with their adhesive-coated surfaces in contact and held together under a pressure of approximately 1 N/cm$^2$ for 24 hours at 22° C. The tensile shear strengths were determined after 24 hours in accordance with DIN 53 281 and 53 283. The tensile shear strength was 23.0 MPa.

The above-mentioned mixture was prepared without the addition of tetrahydrofurfuryl methacrylate for comparison purposes. The gel point of this mixture was 10 seconds and tensile shear strength of a bond formed with it by the same general procedures as described above was only 10.2 MPa.

EXAMPLE AND COMPARISON EXAMPLE 2

20 An adhesive mixture was prepared as described in Example 1, except from the following components:
a) 60 g of a commercially available epoxy resin, a modified glycidyl ether of diphenylol propane, having an epoxide equivalent of 190;
b) 15 g of a commercially available epoxy resin, an oligomer of bisphenol A diglycidyl ether, having an epoxide equivalent of 255;
c) 9 g of trimethylol propane triglycidyl ether;
d) 3.7 g of a commercially available triaryl sulfonium hexafluoroantimonate; and
e) 12 g tetrahydrofurfuryl methacrylate.

The gel point of this mixture was 25 seconds and it produced a bond with a tensile shear strength of 20.3 MPa.

The above-mentioned mixture was prepared without the addition of tetrahydrofurfuryl methacrylate for comparison purposes. The gel point of this mixture was 10 seconds and its bond had a tensile shear strength of only 12.1 MPa.

EXAMPLE 3

An adhesive mixture was prepared as described in Example 1, except from the following components:
a) 80 g of a commercially available epoxy resin, a modified glycidyl ether of diphenylol propane, having an epoxide equivalent of 190;
b) 20 g of a commercially available epoxy resin, an oligomer of bisphenol A diglycidyl ether, having an epoxide equivalent of 255;
c) 8 g of trimethylol propane triglycidyl ether;
d) 12 g methacryloyloxy methyl dihydropyran.

The gel point of the mixture was 7 seconds and its bond tensile shear strength was 17.5 MPa.

What is claimed is:
1. An adhesive consisting essentially of:
(a) one or more components selected from the group of epoxy resins that are bifunctional glycidyl ethers of diphenylol propanes, having epoxide equivalents between about 150 and about 300;
(b) one or more components selected from the group of glycidyl ethers of glycerol, trimethylol propane, pentaerythritol, and novolaks, said glycidyl ethers containing at least three epoxide groups per molecule;
(c) one or more photoinitiators that release protons under the effect of electromagnetic radiation, said photoinitiators being selected from the group consisting of triaryl sulfonium salts corresponding to general formula (IV):

$$\{[Ar^1(R^3)][Ar^2(R^4)][(Ar^3(R^5)]S\}^+X^- \quad (IV)$$

and diaryl iodonium salts corresponding to general formula (V):

$$\{[Ar^1(R^3)][Ar^2(R^4)]I\}^+X^- \quad (V),$$

wherein each "Ar" with a superscript independently represents an arylene group; X$^-$ is selected from the group consisting of perchlorate, tetrafluoroborate (III), hexachloroantimonate (V), hexafluoroantimonate (V), hexachlorostannate (IV), hexafluorophosphate, hexafluoroarsenate (V), tetrachloroferrate (III), and pentachlorobismuthate (III); each of R$^3$, R$^4$, and R$^5$, independently of one another, is selected from the group consisting of hydrogen, a nitro group, a halogen atom, alkoxyl and thioalkyl groups containing 1 to 6 C atoms in a straight-chain or branched radical, phenoxy and modified phenoxy groups containing 1 to 3 substituents in the phenyl radical, and alkanoyl and alkanoylamido radicals containing 1 to 6 C atoms, or in Formula (IV), two of the three substituents R$^3$, R$^4$, and R$^5$ may jointly represent a methylene group, i-propylene group, or carbonyl group that forms a bridge between two adjacent aryl radicals to result in a heterocyclic thioxanthenium ion; and
(d) one or more components selected from the group of acrylates and methacrylates corresponding to general formula I $$\begin{array}{c} R^1 \\ | \\ CH_2=C-C-O-(O-C_mH_{2m})_n-O-R^2 \end{array} \quad (I)$$

in R$^1$ is hydrogen or methyl R$^2$ is a radical with up to 15 carbon atoms that is a hydrocarbon radical except for containing a cationically cleavable C$_2$–C$_5$ oxacycloalkyl or a C$_5$ oxacycloalkenyl group; m is either 2 or 3; and n is 1, 1, or 2.

2. An adhesive composition according to claim 1, additionally comprising at least one component selected from the group of photosensitizers, pigments, and fillers.

3. An adhesive according to claim 2, wherein the weight ratio of component (a) to component (d) is between about 2 and about 11.4.

4. An adhesive according to claim 2, additionally comprising a component (f) selected from the group of esters of acrylic and methacrylic acid with C$_1$–C$_6$ monoalkyls and with $C_2-C_5$ polyalkanols containing 2 to 4 hydroxyl groups, with the mass of component (f) present being not greater than about one fourth of the mass of component (d) present.

5. An adhesive according to claim 1, wherein, in formula (I), n=0 and $R^2$ is selected from groups according to the general formula $—CH_2—R^6$, where $R^6$ is a $C_2-C_5$ oxacycloalkyl ring or a $C_5$ oxacycloalkenyl ring.

6. An adhesive according to claim 5, wherein components (a) and (b) are present in relative amounts such that the ratio of the number of epoxide groups in component (a) to the number of epoxide groups in component (b) is between about 4 and about 20.

7. An adhesive according to claim 1, wherein the substituents $R^2$ is formula (I) has the general formula $—C_6H_4(R^7)—O—$glycidyl, in which $R^7$ is hydrogen or vinyl.

8. An adhesive according to claim 7, wherein the weight ratio of component (a) to component (d) is between about 2 and about 11.4.

9. An adhesive according to claim 1, characterized in that the substituent $R^2$ in formula (I) is a cycloalkyl or bicycloalkyl radical containing an epoxide group and from about 5 to about 10 carbon atoms.

10. An adhesive according to claim 9, wherein components (a) and (b) are present in relative amounts such that the ratio of the number of epoxide groups in component (a) to the number of epoxide groups in components (b) is between about 4 and about 20.

11. An adhesive according to claim 1, characterized in that, in general formula (I), $R^1$ is a methyl group; $R^2$ is a glycidyl-, tetrahydrofuranylmethyl-, dihydropyranylmethyl-, tetrahydropyranylmethyl- or glycidoxyl-substituted styryl group; and n=0.

12. An adhesive according to claim 11, wherein the weight ratio of component (a) to component (d) is between about 2 and about 11.4.

13. An adhesive according to claim 1, characterized in that, in general formula (I), $R^1$ is a methyl group; $R^2$ is an epoxido-tetrahydrodicyclopentadienyl group; m=1; and n=0 or 1.

14. An adhesive according to claim 13, wherein components (a) and (b) are present in relative amounts such that the ratio of the number of epoxide groups in component (a) to the number of epoxide groups in component (b) is between about 4 and about 20.

15. An adhesive according to claim 14, wherein the weight ratio of component (a) to component (d) is between about 2 and about 11.4.

16. An adhesive according to claim 1, wherein components (a) and (b) are present in relative amounts such that the ratio of the number of epoxide groups in component (a) to the number of epoxide groups in component (b) is between about 4 and about 20.

17. An adhesive according to claim 16, wherein the weight ratio of component (a) to component (d) is between about 2 and about 11.4.

18. An adhesive according to claim 1, wherein the weight ratio of component (a) to component (d) is between about 2 and about 11.4.

19. An adhesive according to claim 18, additionally comprising a component (f) selected from the group of esters of acrylic and methacrylic acid with $C_1-C_6$ monoalkanols and with $C_2-C_5$ polyalkanols containing 2 to 4 hydroxyl groups, with the mass of component (f) present being not greater than about one fourth of the mass of component (d) present.

20. An adhesive according to claim 1, additionally comprising a component (f) selected from the group of esters of acrylic and methacrylic acid with $C_1-C_6$ monoalkanols and with $C_2-C_5$ polyalkanols containing 2 to 4 hydroxyl groups, with the mass of component (f) present being not greater than about one fourth of the mass of component (d) present.

* * * * *